United States Patent [19]
Waldschmidt et al.

[11] Patent Number: 5,105,096
[45] Date of Patent: Apr. 14, 1992

[54] TRANSPORT REFRIGERATION SYSTEM WITH STAND-BY COMPRESSOR DRIVE MOTOR ALSO OPERABLE AS A GENERATOR

[75] Inventors: John E. Waldschmidt, New Market; Leland L. Howland, Belle Plaine, both of Minn.

[73] Assignee: Thermo King Corporation, Minneapolis, Minn.

[21] Appl. No.: 353,265

[22] Filed: May 17, 1989

[51] Int. Cl.$^5$ .................. B60P 3/20; F25D 21/08; H02J 9/00

[52] U.S. Cl. .......................... 307/68; 62/151; 62/236; 62/243; 322/8

[58] Field of Search .............. 307/45, 47, 64–68, 307/84, 130, 87; 62/323.1, 323.2, 323.3, 236, 243, 81, 151, 276; 323/205, 208, 209, 210; 322/47, 58, 96, 95, 8; 361/187, 21; 219/508, 509, 519

[56] References Cited

U.S. PATENT DOCUMENTS

| | | | |
|---|---|---|---|
| 2,089,512 | 7/1937 | Upp | 322/8 |
| 2,278,632 | 4/1942 | Baer et al. | 322/8 |
| 3,248,608 | 4/1966 | Farkas et al. | 361/22 |
| 3,283,525 | 11/1966 | Fricke et al. | 62/323.3 X |
| 3,363,167 | 1/1968 | Szabo et al. | 322/8 |
| 3,720,842 | 3/1973 | Martin et al. | 307/68 |
| 4,417,194 | 11/1983 | Curtiss et al. | 322/47 |

Primary Examiner—Howard L. Williams
Assistant Examiner—David Osborn
Attorney, Agent, or Firm—D. R. Lackey

[57] ABSTRACT

A transport refrigeration system including a refrigerant compressor which is alternatively driven by an internal combustion engine or an electric induction motor. The transport refrigeration system achieves and maintains a predetermined set point temperature in a served space by heating and cooling cycles. When additional heat is required during a heating cycle while the internal combustion engine is driving the compressor, capacitors are connected across the induction motor, to cause the motor to function as an induction generator and build up an output voltage. The output voltage is monitored, and when it is sufficient to sustain a load, resistors located to aid the heating cycle are connected to receive the output voltage.

2 Claims, 1 Drawing Sheet

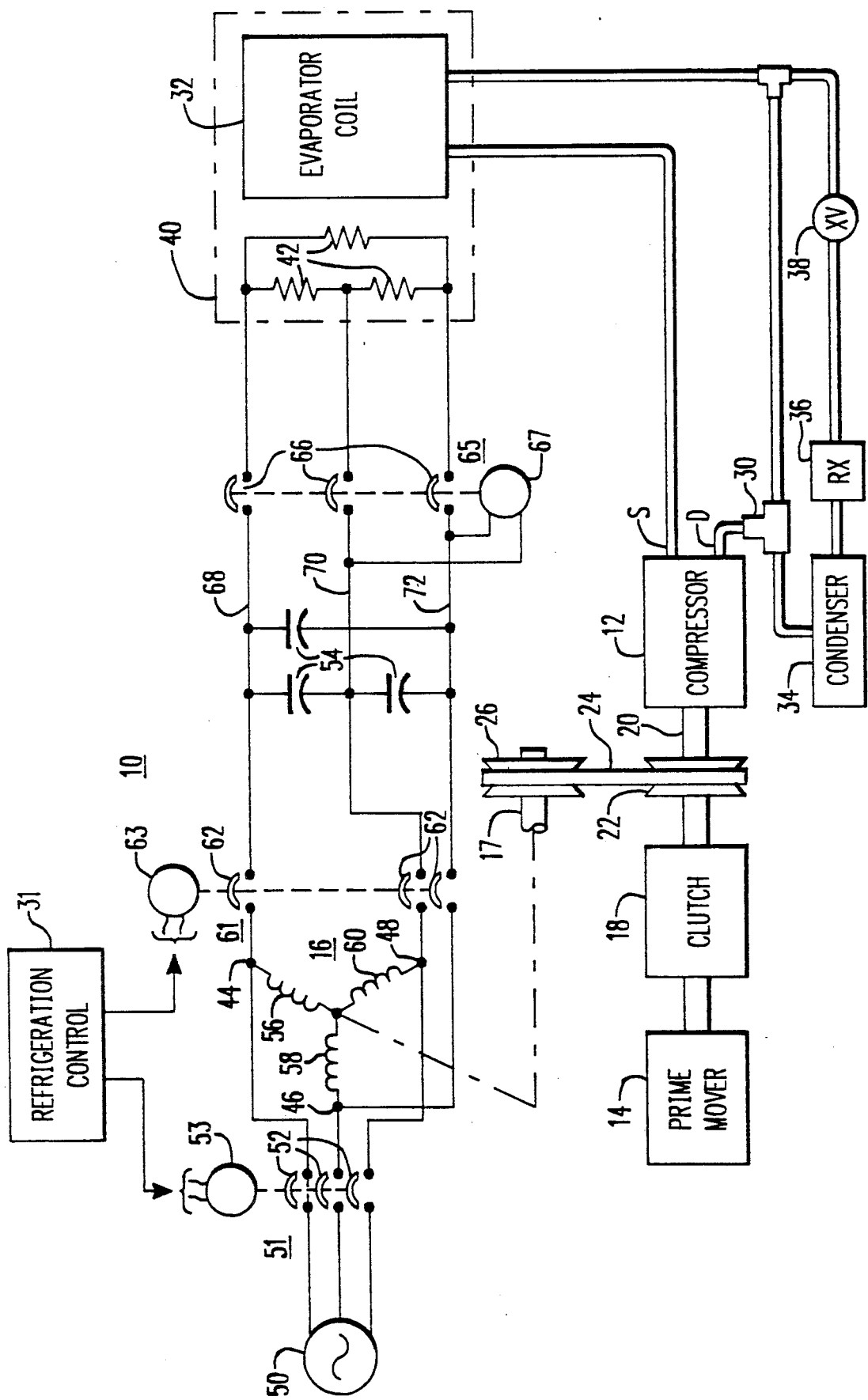

TRANSPORT REFRIGERATION SYSTEM WITH STAND-BY COMPRESSOR DRIVE MOTOR ALSO OPERABLE AS A GENERATOR

TECHNICAL FIELD

The invention relates in general to refrigeration systems, and more specifically to transport refrigeration systems which are alternatively operable with an internal combustion engine or an electric motor as prime mover for a refrigerant compressor.

BACKGROUND ART

It is common in transport refrigeration systems, such as those for trucks, trailers and containers, to drive a refrigerant compressor with an internal combustion engine when the system is away from a terminal, and to drive the compressor via an electric motor when a source of electrical potential is available. As disclosed in U.S. Pat. No. 3,720,842, which is assigned to the same assignee as the present application, it is also known to use the stand-by electric motor as an induction generator while the internal combustion engine is operative, to power fans and defrost heaters. It is an object of the present invention to improve upon the arrangement of the aforesaid patent.

SUMMARY OF THE INVENTION

Briefly, the present invention improves upon the teachings of the aforesaid U.S. Pat. No. 3,720,842 by utilizing the output voltage of the stand-by motor while it is being driven by the internal combustion engine to determine when an electrical load may be connected to utilize the output of the motor. In the present invention, the electrical load is in the form of resistance heaters, which are energized when requested by the associated refrigeration control to provide additional heat during a heating cycle to hold the selected set point temperature, or to provide additional heating capacity during a defrost operation.

Excitation capacitors are connected to the motor when it is desired to use the motor as a generator. This causes the residual magnetism in the motor to begin generating a small voltage. The capacitors cause the initially small voltage to produce a current flow in the motor windings which in turn increases the magnetic field of the motor. This process continues until the output voltage builds to at least about 75% of rated or nominal value, at which time an electrical load may be connected to the output of the stand-by motor. Connecting a load too soon, will defeat the voltage building process, and the output voltage will not build up.

The present invention monitors the output voltage of the stand-by motor via a contactor which also functions to connect an electrical load to the output of the motor. The contactor has a pull-in voltage of about 80% of the rated output of the motor when used as an induction generator or alternator, which is above the value at which a load may be safely connected to the stand-by motor.

Another improvement over the aforesaid patent is the fact that the excitation capacitors are physically connected into the circuit at all times, and they are available to be electrically connected into the circuit even when the induction motor is operating as a motor. In this instance, the electrical source powering the motor will pick up the monitoring contactor without delay, as soon as the refrigeration control calls for additional heating capacity. The function of the capacitors changes from that of excitation capacitors to the function of improving the power factor of the load presented by the transport refrigeration system to the electrical power source.

BRIEF DESCRIPTION OF THE DRAWINGS

The invention will become more apparent by reading the following detailed description in conjunction with the drawings, which are shown by way of example only, wherein the single Figure schematically and diagrammatically sets forth a transport refrigeration system constructed according to the teachings of the invention.

DESCRIPTION OF PREFERRED EMBODIMENTS

Referring now to the single Figure, there is shown a transport refrigeration system 10 constructed according to the teachings of the invention. Transport refrigeration system 10 includes a refrigerant compressor 12 arranged to be alternatively driven by a first prime mover 14, in the form of an internal combustion engine, gasoline or Diesel, or by a second prime mover 16 in the form of an induction motor which is also capable of being operated as an induction alternator. Induction motor 16 includes a shaft 17, which functions as an output shaft when motor 16 is operating as a motor, and as an input shaft when operating as an induction alternator.

While the teachings of the invention are equally applicable to single-phase stand-by motors, for purposes of example motor 16 is illustrated as being a three-phase motor.

The internal combustion engine 14 is coupled to the compressor 12 via a centrifugal clutch 18 and a shaft 20. Shaft 20 includes a pulley 22, and a belt 24 couples shaft 20 to a pulley 26 on the motor shaft 17. Thus, when engine 14 is running, compressor 12 and motor 16 are both driven. When engine 14 is shut down, it is disconnected from shaft 20 via clutch 18, and motor 16 may be energized to drive compressor 12.

Compressor 12 provides hot refrigerant gas from a discharge port D to a three-way valve 30. Three-way valve 30, the functions of which may also be provided by two separate valves, is under the control of refrigeration control 31. When control 31 selects a first or cooling mode position of three-way valve 30, the hot refrigerant gas is directed to an evaporator coil 32 via a condenser coil 34, a receiver 36, and an expansion valve 38. The condenser coil 34 rejects heat from the refrigerant to the atmosphere, the refrigerant condenses and collects as a high pressure liquid in the receiver 36, the expansion valve 38 reduces the pressure of the liquid refrigerant, and the evaporator coil 32 removes heat from a served space 40 and returns vaporized refrigerant to a suction port S of compressor 12.

When refrigeration control 31 determines that a heating cycle is necessary to hold a selected set point temperature in served space 40, or to defrost evaporator coil 32, three-way valve 30 is operated to a second or heating mode position. In the heating mode position, hot refrigerant gas proceeds directly to evaporator coil 32, to add heat to the served space 40 when air flow dampers (not shown) are allowed to remain open, or simply to defrost evaporator coil 32 when the dampers are closed by control 31.

In low ambients, the hot gas heating mode is not as effective, as the refrigerant tends to collect in the condenser coil 34 and is not available to the system 10 to transfer heat from the compressor 12 to the evaporator coil 32. On transport refrigeration systems 10 with a stand-by induction motor 16, it is economical to utilize the induction motor as an induction alternator when the internal combustion engine 14 is operative, to add additional heating capacity to the system. The output voltage of motor 16 energizes electrical resistors 42 disposed in the served space 40, with the $I^2R$ losses of the resistors 42 providing additional heat.

Stand-by induction motor 16 includes terminals 44, 46 and 48 which may be connected to a three-phase AC voltage source 50 via a contactor 51 having contacts 52, and an electromagnetic coil 53. Electromagnetic coil 53 is electrically controlled by refrigeration control 31. Thus, when prime mover 14 is shut down, and a source 50 of AC voltage is available, refrigeration control 31 may energize contactor 51 and drive compressor 12 with motor 16.

When prime mover 14 is operative, compressor 12 and motor 16 are both driven. According to the teachings of the invention, capacitors 54 are arranged to be connected across motor terminals 44, 46, and 48, and thus across motor windings 56, 58 and 60, via a contactor 61 which has contacts 62 and an electromagnetic coil 63. Electromagnetic coil 63 of contactor 61 is selectively energized by refrigeration control 31 when the added heating capacity available in resistors 42 is required.

Resistors 42 are arranged to be connected to motor terminals 44, 46 and 48 via contactor 61, and also via a contactor 65 which has contacts 66 and an electromagnetic coil 67. Contactor 65, unlike contactors 51 and 61, is not under the control of refrigeration control 31, but has its electromagnetic coil 67 connected to be responsive to the voltage between any two electrical conductors 68, 70 and 72, which conductors are connected to motor terminals 44, 48 and 46 via contacts 62 of contactor 61. Thus, when the logic of refrigeration control 31 results in contactor 61 being energized to increase the heating capacity of system 10 via resistors 42, capacitors 54 are connected to motor windings 56, 58 and 60 and the voltage at the motor terminals 44, 46 and 48, as well as the voltage on conductors 68, 70 and 72, starts to build.

When the voltage across conductors 70 and 72 reaches the pull-in voltage of electromagnetic coil 67, which is about 80% of the nominal or rated output of motor 16 when operated as an induction alternator, contactor 65 is operated to connect resistors 42 to receive the output voltage of motor 16. Thus, contactor 65 functions as a voltage monitor, and also as the means for connecting resistors 42 to motor 16 when the voltage monitoring function indicates resistors 42 may be connected to motor 16 without defeating the output voltage building process.

When motor 16 is connected to AC source 50, it will be noted that when refrigeration control 31 energizes contactor 61 to add the heating capacity of resistors 42 to the system, that capacitors 54 are also automatically connected into the circuit. Contactor 65 in this instance picks up as soon as contactor 61 picks up, as source voltage 50 is now on conductors 68, 70 and 72, energizing resistors 42 without delay. Capacitors 54, instead of functioning as excitation capacitors, now function as power factor correction capacitors, improving the power factor of the load presented to AC source 50.

We claim:

1. In a transport refrigeration system which achieves and maintains a predetermined set point temperature in a served space via cooling and heating cycles, including a refrigerant compressor alternatively driven by an internal combustion engine and an electric induction motor, with the electric induction motor having terminal means for connection to an electrical source voltage, and also for providing an output voltage for aiding the heat cycle of the refrigeration system when the electrical induction motor is disconnected from the electrical source and driven as an induction generator by the internal combustion engine, the improvement comprising:

capacitor means, first contactor means connecting said capacitor means to the terminal means of said electric induction motor when it is desired to operate said electric induction motor as a generator, resistance means, second contactor means including an electromagnetic coil having a predetermined pull-in voltage, and normally open electrical contacts, said electromagnetic coil of the second contactor means being responsive to the magnitude of the output voltage of the electrical induction motor, closing its normally open electrical contacts and directly connecting said resistance means to receive the output voltage of the induction motor after the output voltage builds up to said predetermined pull-in voltage, said capacitor means being additionally connected to the terminal means when it is desired to energize the resistance means from an electrical source voltage, to enable the capacitor means to function as power factor correction capacitors while the electric induction motor is connected to the electrical source voltage and operating as a motor.

2. In the transport refrigeration system of claim 1 wherein the second contactor means is responsive to the electrical source voltage, the second contactor means is energized at the same time the capacitor means is connected to the electrical source voltage to initiate the connection of the resistance means to the electrical source voltage.

* * * * *